United States Patent [19]
Chang et al.

[11] Patent Number: 5,960,436
[45] Date of Patent: Sep. 28, 1999

[54] TRANSACTION COMPACTION FOR REPLAY OF TRANSACTIONS FROM CLIENT TO SERVER

[75] Inventors: Hung-Yang Chang, Yorktown Heights; Anthony Cocchi, Larchmont; Stephen Edwin Smith, Mahopac, all of N.Y.

[73] Assignee: International Business Machines Corp., Armonk, N.Y.

[21] Appl. No.: 08/920,816

[22] Filed: Aug. 29, 1997

[51] Int. Cl.[6] ........................................... G06F 17/30
[52] U.S. Cl. ................................. 707/101; 707/202
[58] Field of Search .................. 707/10, 101, 201–204

[56] References Cited

U.S. PATENT DOCUMENTS

| | | | |
|---|---|---|---|
| 5,036,518 | 7/1991 | Tseung | 371/32 |
| 5,046,002 | 9/1991 | Takashi et al. | 707/8 |
| 5,553,282 | 9/1996 | Parrish et al. | 707/10 |
| 5,613,155 | 3/1997 | Baldiga et al. | 395/825 |
| 5,659,735 | 8/1997 | Parrish et al. | 707/10 |
| 5,745,750 | 4/1998 | Porcaro | 707/102 |
| 5,752,245 | 5/1998 | Parrish et al. | 707/10 |
| 5,774,717 | 6/1998 | Porcaro | 707/202 |

*Primary Examiner*—Maria N. Vonbuhr
*Attorney, Agent, or Firm*—Douglas W. Cameron; Anne Vachon Dougherty

[57] ABSTRACT

The invention provides a method for compacting transactions which have committed at a disconnected client prior to sending the transactions to the server for replaying along with an iterative process for re-calculating the combined transaction in the event that replay at the server fails.

19 Claims, 14 Drawing Sheets

TRANSACTION COMPACTION FOR REPLAY OF TRANSACTIONS FROM CLIENT TO SERVER

FIELD OF THE INVENTION

This invention relates to client-server computing environments having low bandwidth, and more particularly to optimizing transaction update exchanges between a client computer and its associated server.

BACKGROUND OF THE INVENTION

A networked computing system, as illustrated in FIG. 1, comprises a server computer 100, having access to database 110 and associated with multiple client computers 150, each having at least one local storage location and a local file system 130 and each adapted to communicate with the server over communication channel 140. The server computer may be a general purpose computer, such as an IBM* RISC System 6000*; the database, a relational database such as DB2*; and, the client computers, notebook computers such as the IBM Thinkpad*, or similar computing devices which communicate with the server by modem. (*Trademarks of International Business Machines Corporation).

Applications running on the illustrated mobile system are implemented using an object-oriented programming language, such as JAVA (Trademark of SunMicrosystems, Inc.). The instances of JAVA objects used in the applications are stored in the relational database 110 of the server as tuples, with each object stored in one tuple 210, as shown in FIG. 2a. The transformation from relational tuple to JAVA object occurs in the server. JAVA object serialization is used to stream the data in a JAVA object to an array of bytes, which is then stored as the Object Data 213 of the relational tuple. The object data can be stored in a number of alternative ways, for example, in a large binary field, or with attributes of object mapped to a field in a relational tuple, or such other means as are detailed in an article entitled "Using the Co-existence Approach to Achieve Combined Functionality of Object Oriented and Relational Systems," by R. Ananthanarayanan, et al, ACM-SIGMOD Proceedings (May 1993), pp 108–118. The tuple for an object in the database also contains an object ID, OID 212, which uniquely identifies the object, along with a version number, Vdb 211, which is used for detecting conflicting updates.

The applications running on a mobile system of the type illustrated are transaction-based applications, which use optimistic concurrency control. Optimistic concurrency control is well-known in the art, as detailed in *Distributed Systems: Concepts and Design,* by Coulouris and Dollimore, (Adison Wesley, 1988), page 181 et seq. Under an optimistic concurrency approach, all transaction updates are automatically allowed, without requiring locks to be acquired. When a transaction attempts to commit, version numbers are checked to determine if any of the objects used in the transaction were modified while the transaction was running. If not, the commit succeeds and the modified objects are written to the database with new version numbers. If any version numbers differ, then the commit fails and the transaction is aborted.

Due to the fact that the bandwidth of the communication channel 140 between the client and the server is limited and can be somewhat unreliable, a disconnected style of operation is used for running applications at the client. Under disconnected system operation, a client wishing to run an application first requests objects from the server, downloads those objects needed by the application, and stores the downloaded objects in a storage location associated with the local file system 130. The client then disconnects from the server, and proceeds to execute one or more transactions locally. When an application commits a local transaction, the transaction is recorded by the client's local file system which dynamically creates a record of the transaction and of the modified object(s). When the client subsequently reconnects with the server, the logged transactions are read from the client's local file system, sent to the server, and replayed on the server, with the modified objects being written back to the server's database 110.

FIG. 3 depicts the logical entities involved when an application is executing on a client while the client is disconnected from the server. Thus far the data items have been referred to as "objects," which would be the data items operated on in an object-oriented programming environment. The term "objects" will be used throughout to refer to data items of any format. A transaction object, as illustrated at 250 of FIG. 3 is created when the application program 260 starts the transaction. The transaction object records the objects 270, shown as OBJECT1 (a READ-ONLY object, as indicated by the unidirectional communication lines), OBJECT2 . . . OBJECTn, being used by the transaction. These objects reside in volatile memory, having been retrieved from the client's Local Object Store 400 where the objects had been stored after downloading from the server. While transactions are running, the fact of modification is being recorded in the lock mode field 217 of the object shown at 2b. When the application commits the transaction, modified objects are written to the Local Object Store 400 and the transaction is logged, along with, representatively, lock mode and location information, in the client's Transaction Log 500.

The client's Local Object Store is responsible for storing objects resident on the client, and is implemented using the client local file system. FIG. 4 shows details for an implementation of a Local Object Store 400 at a client computer. The Local Object Store contains multiple ClassStores 420, one for each object class that has instances stored on the client. The ClassStores are identified by the name of each class and the Local Object Store additionally builds and maintains a ClassStore index 401 which maps the name of a class to the ClassStore object for that class.

Each ClassStore has an Object Data file 422 which stores instances of objects 220, and an object Index 421 which is used to locate objects in the Object Data File. When objects are resident on the client, the object, 220 as shown in FIG. 2b, contain additional control fields. Beyond the object ID 212 and the object data 213, the object additionally includes the transaction ID, 214, of the client transaction which created that version of the object; the version number of the object, Vc, at 215, set at the time the creating transaction committed; Vi, 216, which is the version number of the initial version of the object that was read by the transaction identified by the TID; and Lock Mode, 217, which indicates whether an object has been modified or has only been read by the running transaction, 250.

The Object Index is indexed by Object ID, OID 212. The index entries are Object References (hereinafter referred to as "Object Refs") 230, 230', and 230", which are detailed in FIG. 2c. The offset 219 and length 221 fields of the index Object Refs are used to specify where to find the corresponding object instance in the Object Data file 422.

A ClassStore contains the initial server version of each object which was downloaded from the server before the client disconnected. It also contains each of the modified versions of objects, created by transactions which run on the client while disconnected. Thus, a ClassStore is capable of storing multiple versions of the same object, (i.e., having the same OID). The different versions of an object are identified, and differentiated, by the Transaction Identifier (hereinafter, "TID") of the client transaction which made the modifications to the object. In the Object Index, Object Refs for the different versions of an object, having the same OID and different TIDs, are linked together by the "next" field 222 in the Object Refs.

When a new or modified object is stored in the ClassStore for the object's class, the object is serialized to a byte array, using JAVA** object serialization; the byte array is written to the Object Data File 422,; and, an Object Ref 230 if created. In addition, the Object Ref ClassName 218 is set to the name of the class of the object; the offset field 219 is set to the location of the object byte array in the file; and, the length field is set to the size of the object byte array. The OID in the new Ref is set to the object's OID, and the TID in the Ref is set to the transaction which created or modified the object being written. The version numbers, $V_i$ for the initial version and $V_c$ for the version at commit, are copied from the object and the new object Ref is added to the linked list of Object Refs for objects having the same OID. The version "number" need not necessarily be a sequential numerical value, provided that it is a globally unique characteristic which identifies the object version. For one implementation of the present invention, the version "number" comprises a combination of a time stamp, a one-up number, and the CPU number. The new Object Ref is added to the top of the list and the index entry for that OID is changed to point to the new Object Ref, so that the list of Object Refs is ordered by time of insertion, with the most recent version being first on the list.

FIG. 4 shows Object Refs 230, 230' and 230'' including the index structure for versions of a single object having OID=11. Three versions of the object are stored in the ClassStore including the initial download version, having TID=0, and the versions created by client transactions 4 and 8. A TID value of 0 is used for initial versions of objects downloaded from the server.

The client Local Object Store and its ClassStores support two basic retrieval operations. One operation is retrieval of the most recent version of an object, given its ClassName and OID, which is used by running transactions for retrieving an object from the Local Object Store. The second operation is retrieval of a specific version of an object, given its ClassName, OID, and TID. The latter retrieval operation is required for replaying of logged actions on the server when a client reconnects, which operation is the subject of the present invention.

The client Transaction Log, shown at 500, is responsible for logging transactions executed on the client while it is disconnected from the server, and also uses the client local file system. When an application running on a disconnected client commits its current transaction, it causes a "Local Commit" which logs the transaction in the client's Transaction Log 500 for subsequent replay on the server. FIG. 7 details the processing for a local commit operation on the client computer, as detailed below.

FIG. 5 depicts the client Transaction Log 500 comprising a Transaction Log File 510 and a Transaction File 520 for each locally committed transaction, which contains the TID of the transaction. The Transaction File contains Object Refs 239 for objects in the transaction's Read Set and Write Set. Refs for objects in the Write Set will all have a TID field whose value is the TID of the committed transaction, since the transaction created those versions of the objects. Refs for objects in the Read Set will all have a TID field which differs from that of the committed transaction, since a previous transaction created that version of the object which is simply being read by the current transaction.

The Transaction File does not store the actual contents of the objects which have been modified by the transaction. Rather, the modified objects are written to the Local Object Store during processing of the local commit. When a transaction is replayed, the objects modified by the transaction are retrieved from the Local Object Store, using the ClassName, OID, and TID values in the Object Refs from the transaction's Write Set (wherein the TID will match that of the transaction being replayed).

When processing a local commit operation, as shown in FIG. 7, the client computer computes the time for the commit, $T_c$, at 71, and obtains the Read Set of objects which were only read during the transaction, at 72. Next, at 73, the client obtains the Write Set containing those objects which had been modified during the transaction; and at 74, for each object in the Write Set, the client sets the TID for the transaction, sets the version number, $V_c$, in the object to $T_c$, and writes the modified object to the Local Object Store. Next, at 75, the client creates a Transaction File for the committing transaction and writes the Object Refs for each object in the Read Set and Write Set to the Transaction File at 76. Finally, at 77, the client writes a log record for the transaction to the Transaction Log File.

When a client reconnects with the server, it is necessary to replay on the server all of the transactions which executed, were locally committed, and were logged at the client while it was disconnected. The simplest strategy for replaying transactions is to replay the transactions one by one in the order in which they executed on the client. For each logged transaction, the system reconstructs the final state of the transaction Read Set and Write Set at the time that the transaction was committed. The Read Set 521, consisting of Object Refs 230, but not the actual objects, for objects read by the transaction, is found in the Transaction File 520 of the client's Transaction Log. The Write Set, consisting of new objects and objects modified by the transaction, is accessed by using the Object Refs in the Transaction File Write Set 522, including the ClassName, OID, and TID, to retrieve the created and modified versions of the objects from the Local Object Store.

The Read Set of Object Refs and Write Set of objects are sent to the server to be replayed. "Replay" in this context does not mean re-executing the logic of the application. Rather, it means attempting to commit the final state of the client transaction against the server's database, as if the transaction had just executed at the server. The procedure for committing a client transaction during replay employs standard "optimistic concurrency control" techniques. The server begins a database transaction and compares the initial version numbers of all objects in the Read Set and Write Set to the version numbers of the same objects in the server database. If the initial version numbers differ for any object (indicative of the fact that the version has been modified at the server), the server rejects the transaction. The rejected transactions are typically logged on the server for subsequent conflict resolution, the details of which are not the subject of the present invention. If, however, all initial version numbers match, then the objects in the Write Set are written to the database with new version numbers; the server transaction is committed, and the replay succeeds. When using this basic replay strategy, the logged client transactions are replayed one by one in sequence, independent of whether or not any of the preceding transactions failed during replay at the server. A disadvantage of such sequential replay is that the intermediate versions of objects that have been modified several times must each be replayed, only to be replaced in short order. The unnecessary replay iterations consume bandwidth on the communications links and usurp valuable server time and resources.

It is therefore an objective of the present invention to provide a method for computing a combined transaction at the client from a set of logged client transactions which are waiting to be replayed.

It is another objective of the invention to provide a combined transaction to the server for replay whereby bandwidth and server CPU time are utilized most efficiently.

SUMMARY OF THE INVENTION

The invention provides a method for combining transactions which have committed at a disconnected client, prior to sending the transactions to the server for replaying, along with an iterative process for paring the combined transaction in the event that replay at the server fails. The client computer combines the Read Sets and Write Sets for the completed client transactions to produce a combined Read Set of objects downloaded from the server which were only read by client transactions and a combined Write Set of the most recent versions of objects created or modified by client transactions, each object having an indicator as to its initial version. Those objects for which the initial version does not match the downloaded version will fail upon replay at the server and become part of a conflict set. If replay fails, the client will remove those transactions from the combined transaction which used objects in the conflict set or which have a transitive dependence on transactions which used objects in the conflict set. A successive combined transaction will be provided for replay at the server, and process repeated until replay is successful.

BRIEF DESCRIPTION OF THE DRAWINGS

The invention will now be discussed in greater detail with specific reference to the appended drawings wherein.

DESCRIPTION OF THE PREFERRED EMBODIMENT

In accordance with the present invention, committed transactions are compacted prior to uploading for replay at the server. The transactions which are waiting for replay are ideally combined into a single Combined Transaction (hereinafter, "CT"), with the CT first compute using all logged client transactions. Due to possible conflicts, as detected by the optimistic concurrency control at the server, it may be necessary to subsequently recompute the CT using a subset of the logged transaction, if the replay transaction fails. Once the CT has been computed, the CT is provided to the server for replay. With each successive replay attempt, if the replay fails, a new CT is computed and replay attempted again, until all transactions in the transaction set have been either committed at the server, or added to the set of conflicting transactions requiring conflict resolution.

Figure 9:
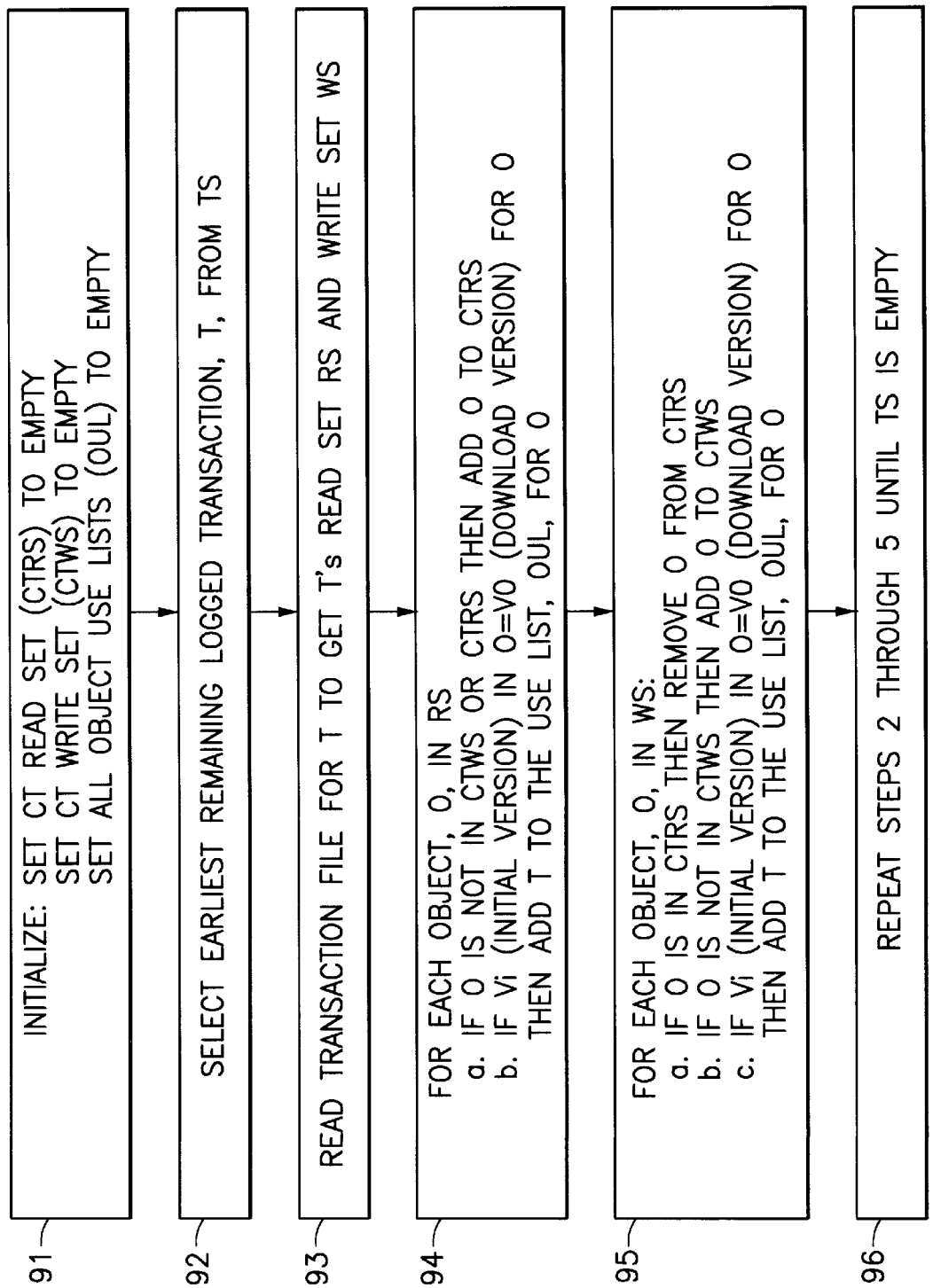
FIG. 9 is a flow chart illustrating the process for computing a combined transaction in accordance with the present invention.

FIG. 9 details the process flow for computation of a CT for a given set of logged client transactions, TS. At step 91 initialization is performed wherein the CT Read Set (CTRS) is set to empty, the CT Write Set (CTWS) is set to empty, and the Object Use lists are set to empty. Next, at 92, the earliest occurring logged transaction, T, is selected from TS and its Transaction File is read, at 93, to obtain the Read Set and WriteSet for the transaction. For each object, O, in the transaction's, T's, Read Set, the client performs step 94 to analyze each object. In the analysis, the client determines if the initial version, $V_i$, of the object is the same as the downloaded version $V_O$. If the same, then T is added to the use list, OUL, for O and, if O is not already in either the CTWS or the CTRS, then O is added to the CTRS. It is to be noted that creation and maintenance of the OUL in an optional step for implementation of the present invention.

For each object, O, in the WriteSet, the client performs step 95. If the initial version, $V_i$, in O is the same as the downloaded version, then T is added to the use list, OUL, for O. If the initial version in O is not the same as the downloaded version, T is not added to the use list. In either case, if O is not already in either the CTWS or the CTRS, then O is added to the CTWS. If O was in the CTRS, 0 is removed from the CTRS and added to the CTWS (since, it has been modified and not simply read). Each of the above steps is repeated, at 96 until all transactions have been analyzed.

The process 91–96 results in two sets of objects, a combined transaction Read Set, CTRS, of objects which were only read by the transactions in TS, and a combined transaction WriteSet, CTWS, of objects which were modified by one or more of the transactions in TS. Clearly, the process could generate only a CTWS if all of the transactions wrote/modified all of the objects, or only a CTRS if all of the transactions only read the objects. The process additionally results in compilation of an Object Use list, OUL, for each object, which list shows the set of all transactions which operated on (i.e., either read or modified) the downloaded object during the disconnect period.

Figure 1:
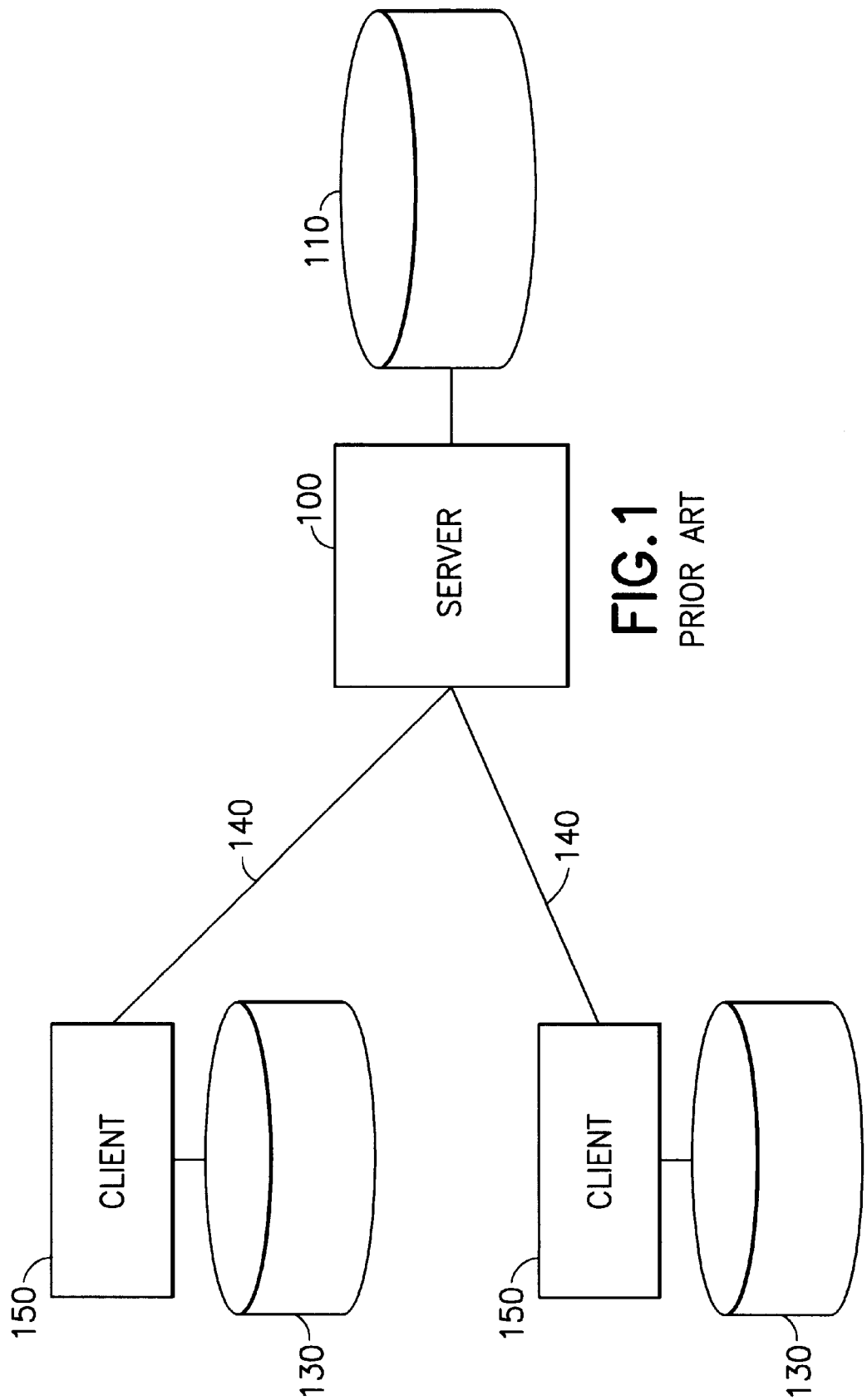
FIG. 1 schematically illustrates a mobile computing network which may implement the present invention.
Figure 2A:
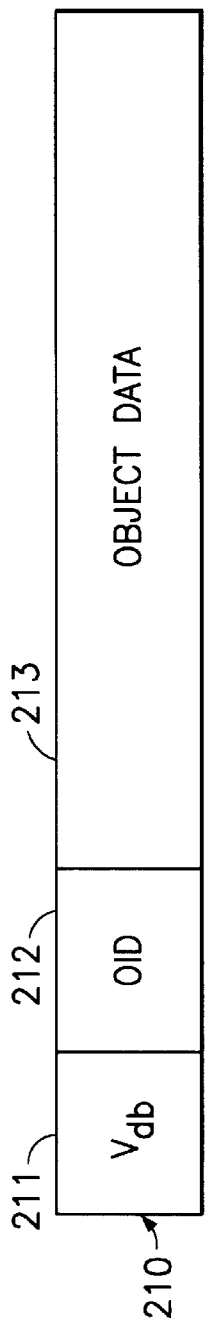
FIGS. 2a, 2b and 2c depict the object record at the server, object record at the client, and client object reference, respectively.
Figure 2B:
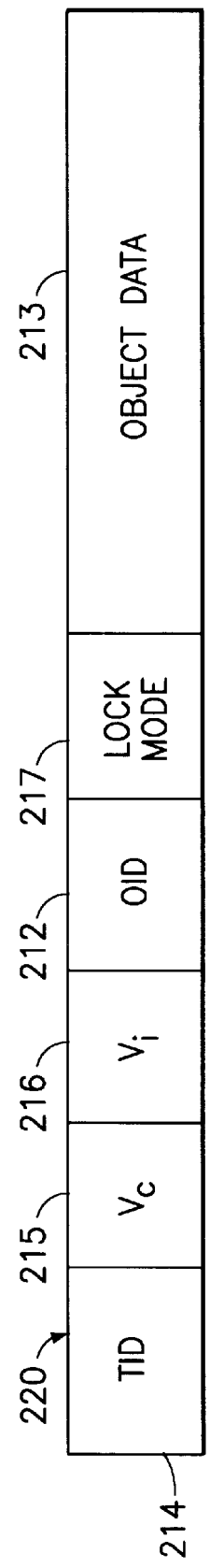
Figure 2C:
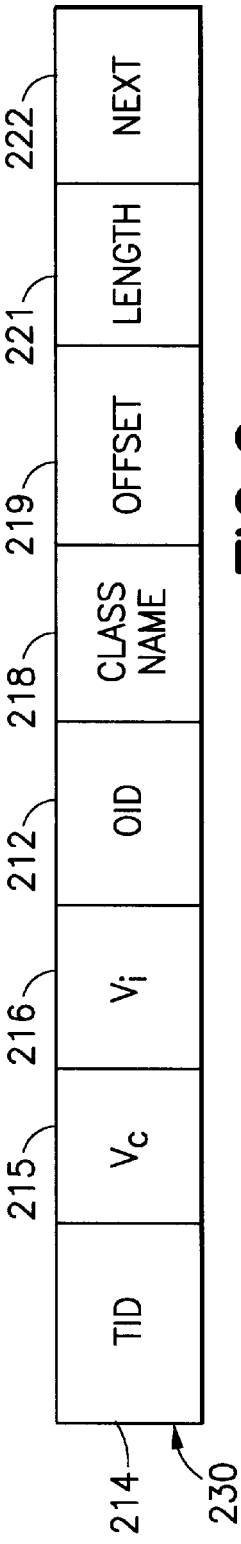
Figure 3:
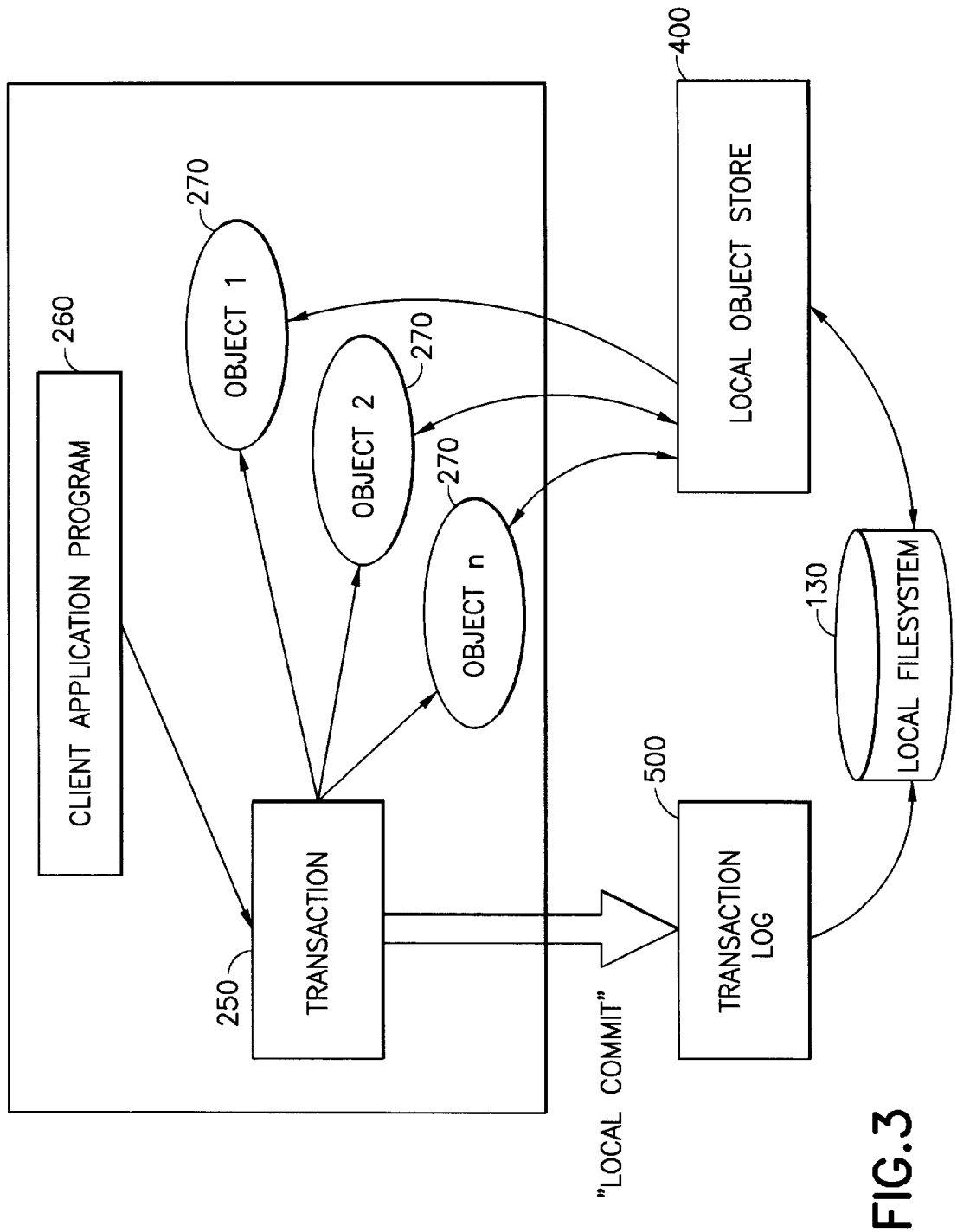
FIG. 3 depicts the entities involved when an application is executing on a client while disconnected from the server.
Figure 4:
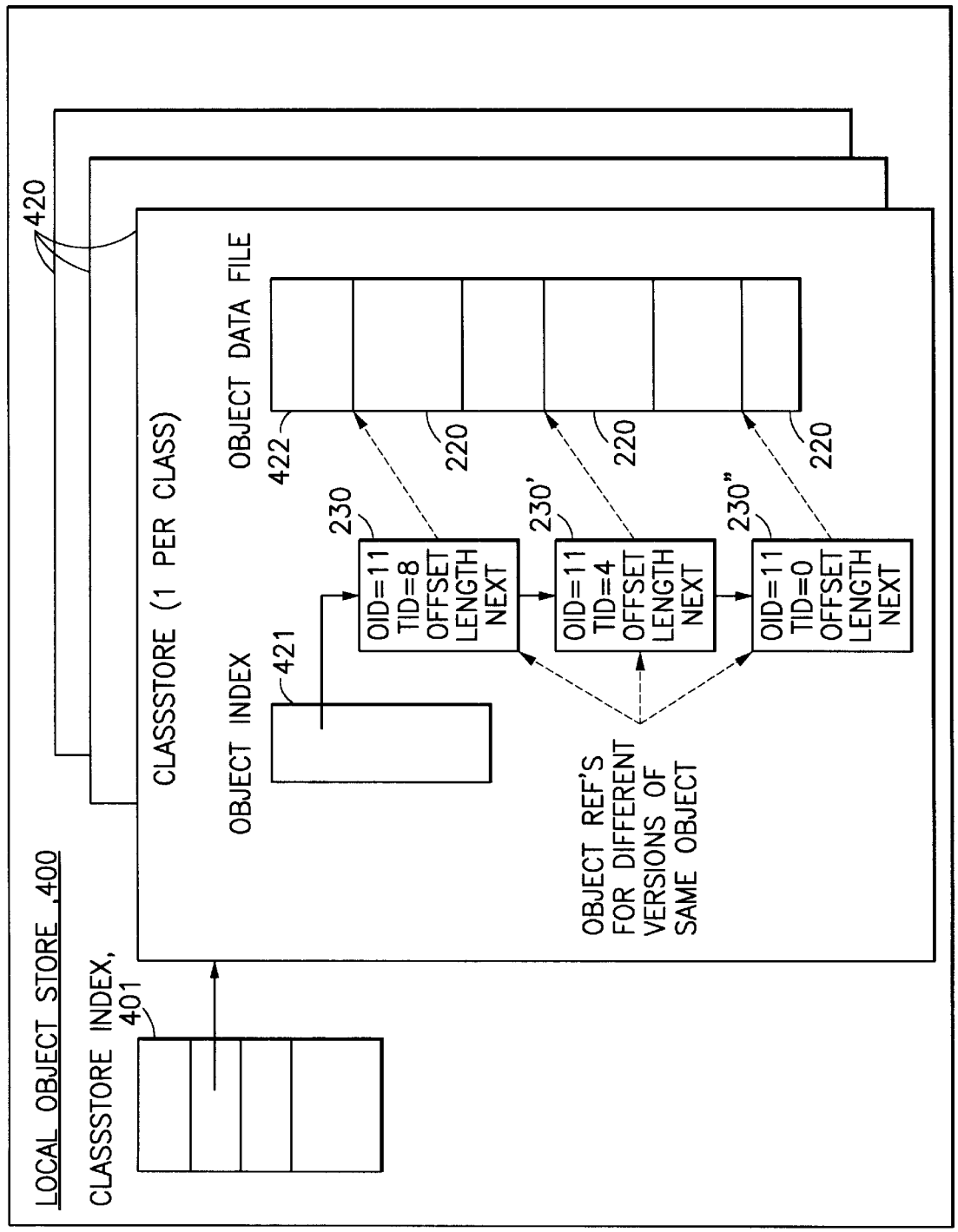
FIG. 4 schematically details the Local Object Store at the client.
Figure 5:
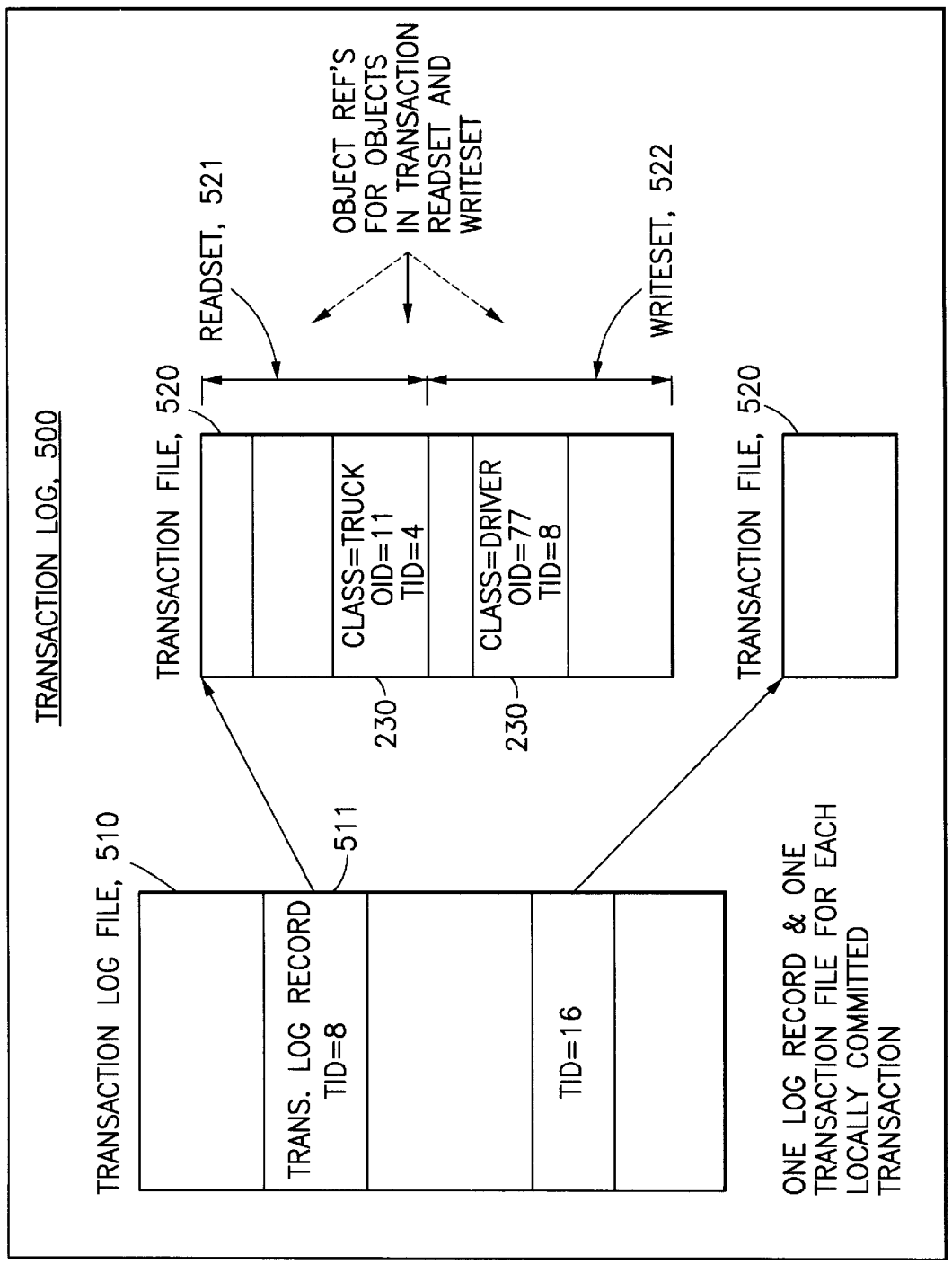
FIG. 5 schematically details the Transaction Log at the client.
Figure 6:
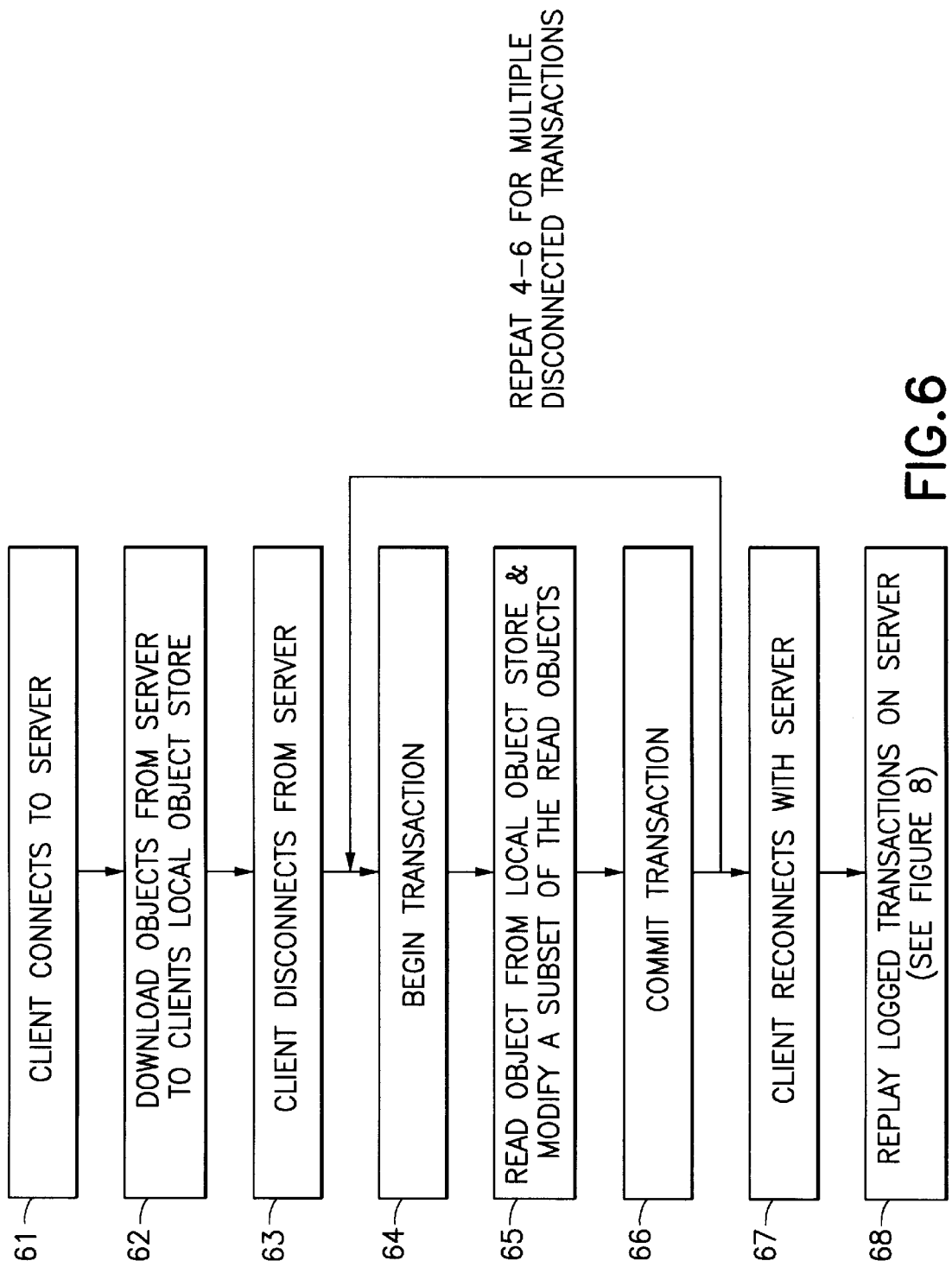
FIG. 6 shows the process flow of a typical application running on a disconnected client.
Figure 7:
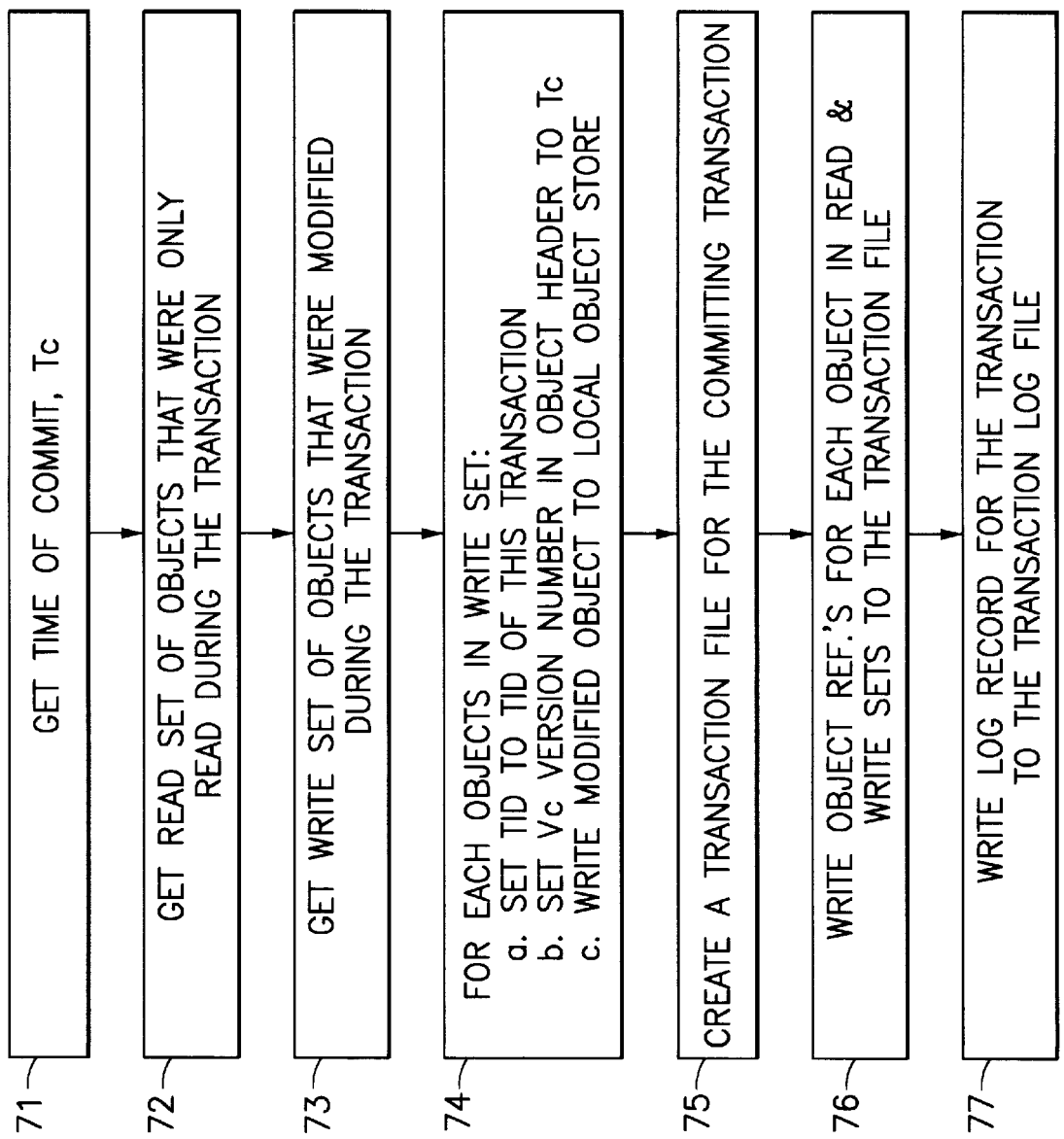
FIG. 7 provides a flow chart illustrating the processing of a local commit on a client while the client is disconnected from the server.
Figure 8:
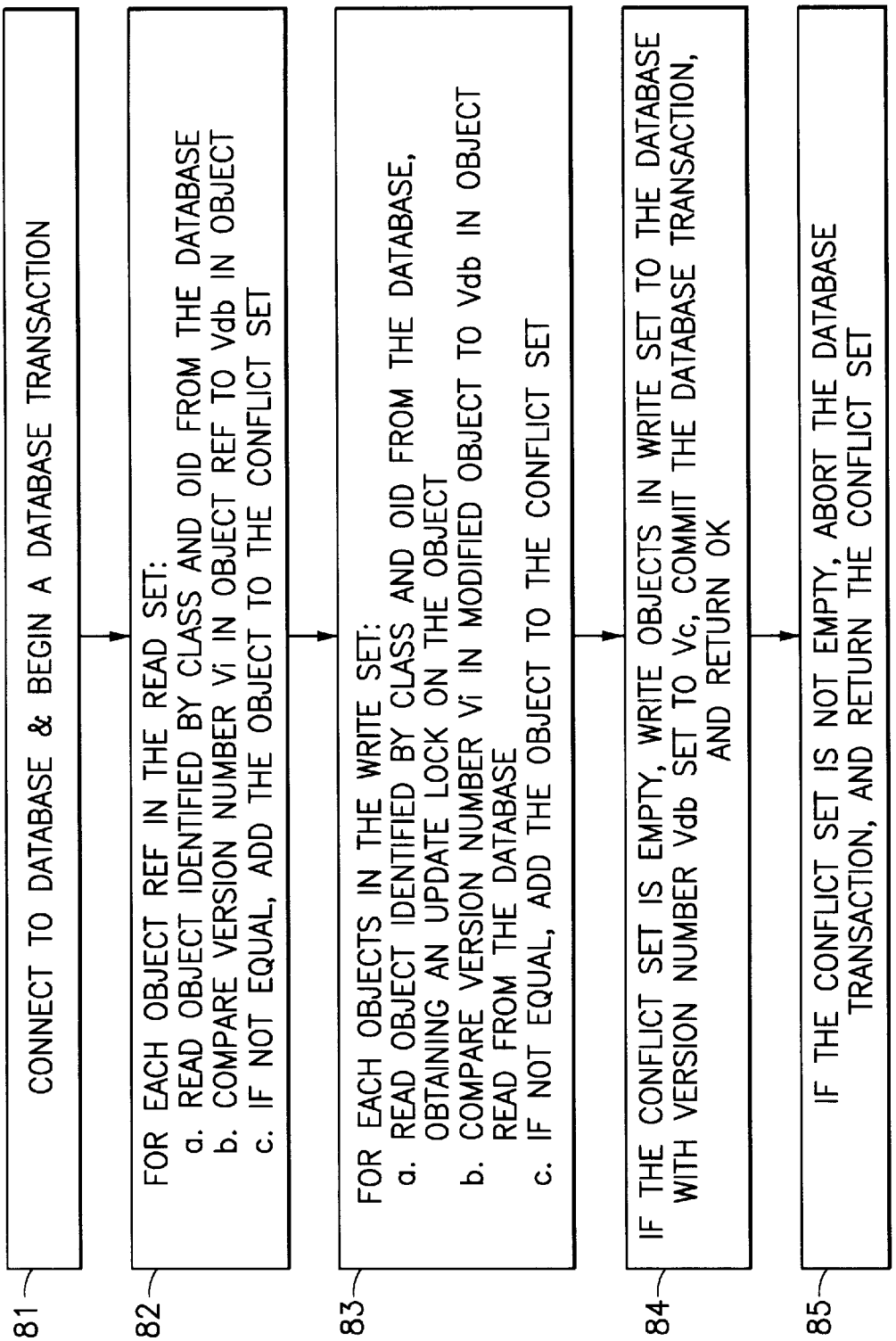
FIG. 8 is a flow chart illustrating the replay process of a locally committed transaction on a server, after a client has reconnected.

The flow chart of FIG. 8 details the replay of a CT at the server. CTs are replayed on the server using a variation of standard optimistic concurrency control, comparing the initial version numbers in the objects with the version numbers in the server database, and requiring that they match. The variation involves computing a Conflict Set (hereinafter, "CS") of all objects that are in conflict, or the IDs of those objects in conflict. To do this, the versions numbers of all objects in the CT are examined, even after one or more objects have failed the equality test. If the computed CS is empty, then the replay of CT succeeds, and the modified objects are written to the database, with new version numbers. If the computed CS is not empty, then the replay of CT fails, and the conflict set CS is returned to the client, where a new CT is computed.

Figure 10:
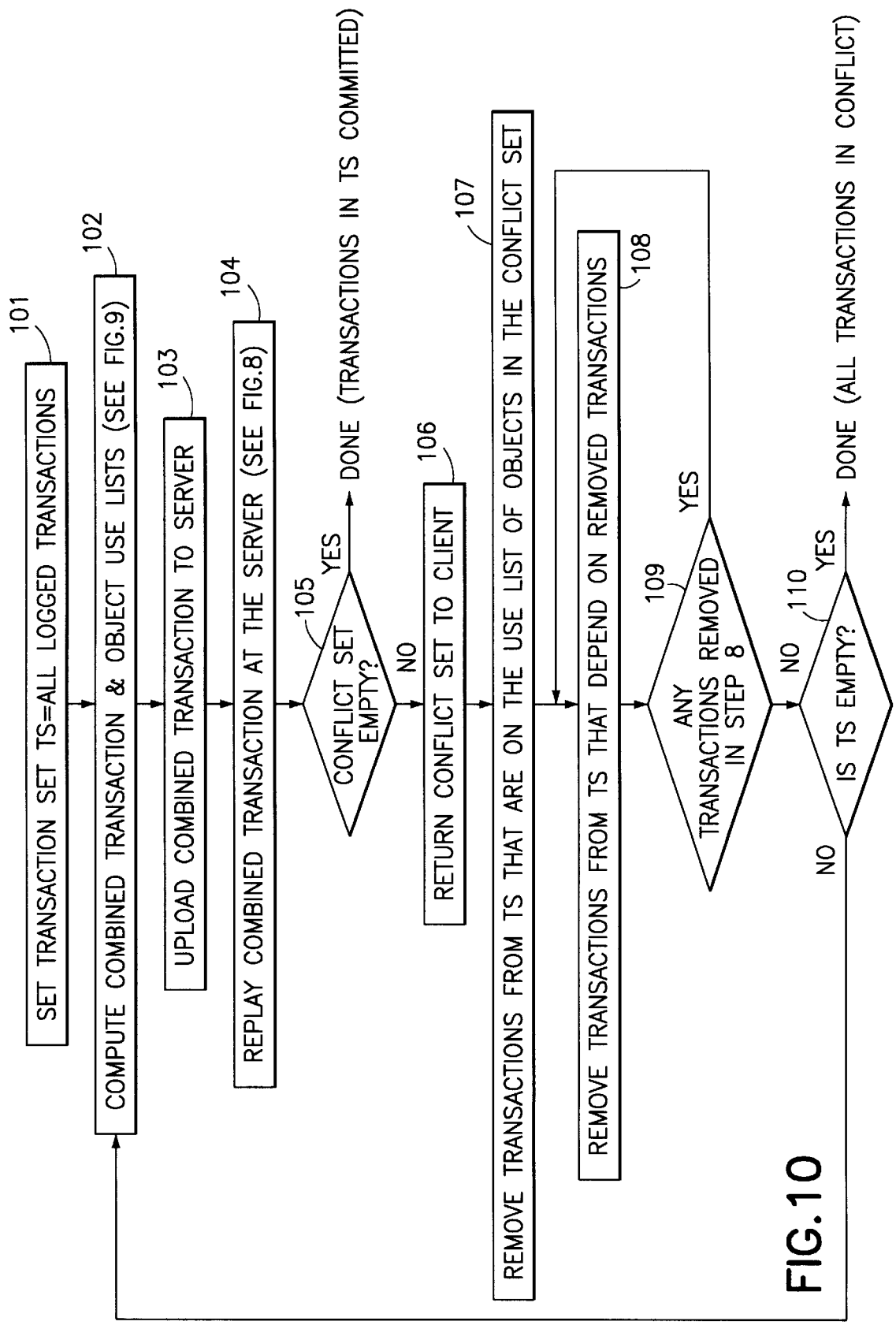
FIG. 10 describes the process for compacting the transaction log for replaying logged transactions when a client reconnects, in accordance with the present invention.

The overall process of replaying a client's logged transactions with dynamic log compaction is detailed with reference to FIG. 10. In steps 101 and 102, a CT is computed using all of the logged client transactions, and Object Use lists, OULs, are computed for each object, using the computation of FIG. 9. At step 103 the CT is uploaded to the server and replayed at the server in step 104 in accordance with the process set forth in FIG. 8. For the CTWS, the entire objects are sent to the server; whereas, for the CTRS, only the Objects Refs are sent. In fact, only the ClassName, OID and $V_i$ fields of each Object Ref is needed for the CTRS contents, rather than the entire Object Refs.

After replay at 104, a determination is made at 105 as to whether the conflict set is empty. If empty, then the replay process has been completed and the CT has been successfully committed at the server. If not empty, such that some versions of the objects in the CTRS or CTWS do not match the initial versions originally downloaded from the server, then the conflict set, CS, is returned, at step 106, to the client where a new CT will be computed on a subset of TS. In step 107, the OUL is scanned for each object in the CS and the transaction indicated in the OUL is removed from TS. The removed transactions are those which have in their Read Set or WriteSet objects which are known to be in conflict because they were modified at the server after they were downloaded to the client. Subsequently, in step 108, the client removes from TS those transactions which either read or modified versions of the objects that were created by transactions removed by step 107, since they too would have operated on an object which is no longer valid. At step 109, the determination is made as to whether any transactions remain in the Transaction Set, TS. If TS in empty, then the replay process terminates, with the result being that none of the transactions in TS can be committed at the server. If, however, TS is not empty, the process returns to step 107. Multiple iterations are possible, wherein TS is not empty, because locks are held on objects in the server database only during the replay of an individual CT. If a CT fails, the locks are released during computation on the client of a new TS and CT. Changes made by other clients to the server database may cause additional conflicts when the revised CT is replayed. If there are no changes allowed to the server database while a client's transactions are being replayed, then the second CT, if necessary, would be guaranteed to succeed without conflict.

Figure 11:
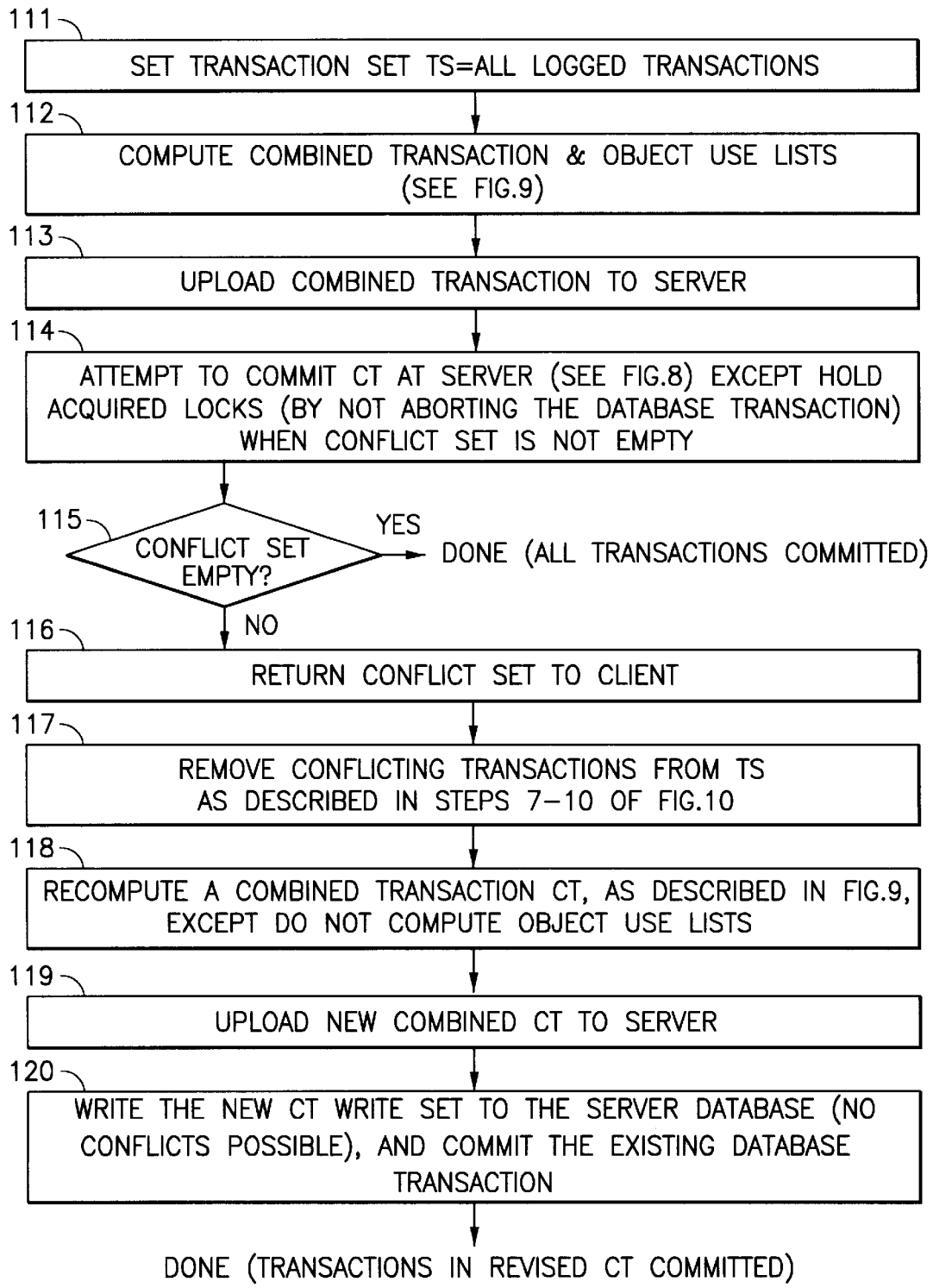
FIG. 11 details an alternative process for replaying logged transactions when a client reconnects, in accordance with the present invention.

FIG. 11 provides an alternative process wherein database locks obtained during the replay of the first CT can be retained during the computation and replay of the second CT. Such will guarantee that the second CT will succeed upon replay. In the alternative implementation, the first steps, 111, 112 and 113, parallel steps 101, 102 and 103. Step 114 involves committing the initial CT, as in Step 104, except that locks obtained during the attempt to commit are not released if the CT is not empty (as determined in step 115), so that the database transaction is not aborted. Once the CS has been returned to the client, at 116, step 117 revised the TS as described in steps 107 and 108 above, thereby computing a successive set of transactions to be committed. In step 118, a second combined transaction is computed except that OULs are not compiled. Step 119 uploads the second combined transaction to the server and, in step 120, the second CT is committed to the server database. In this embodiment, step 120 is a continuation of the database transaction initiated at step 114, so that database locks do not have to be reacquired. In 120, it is only necessary to write the changed objects in the second CTWS to the database and then commit the database transaction.

Figure 12:
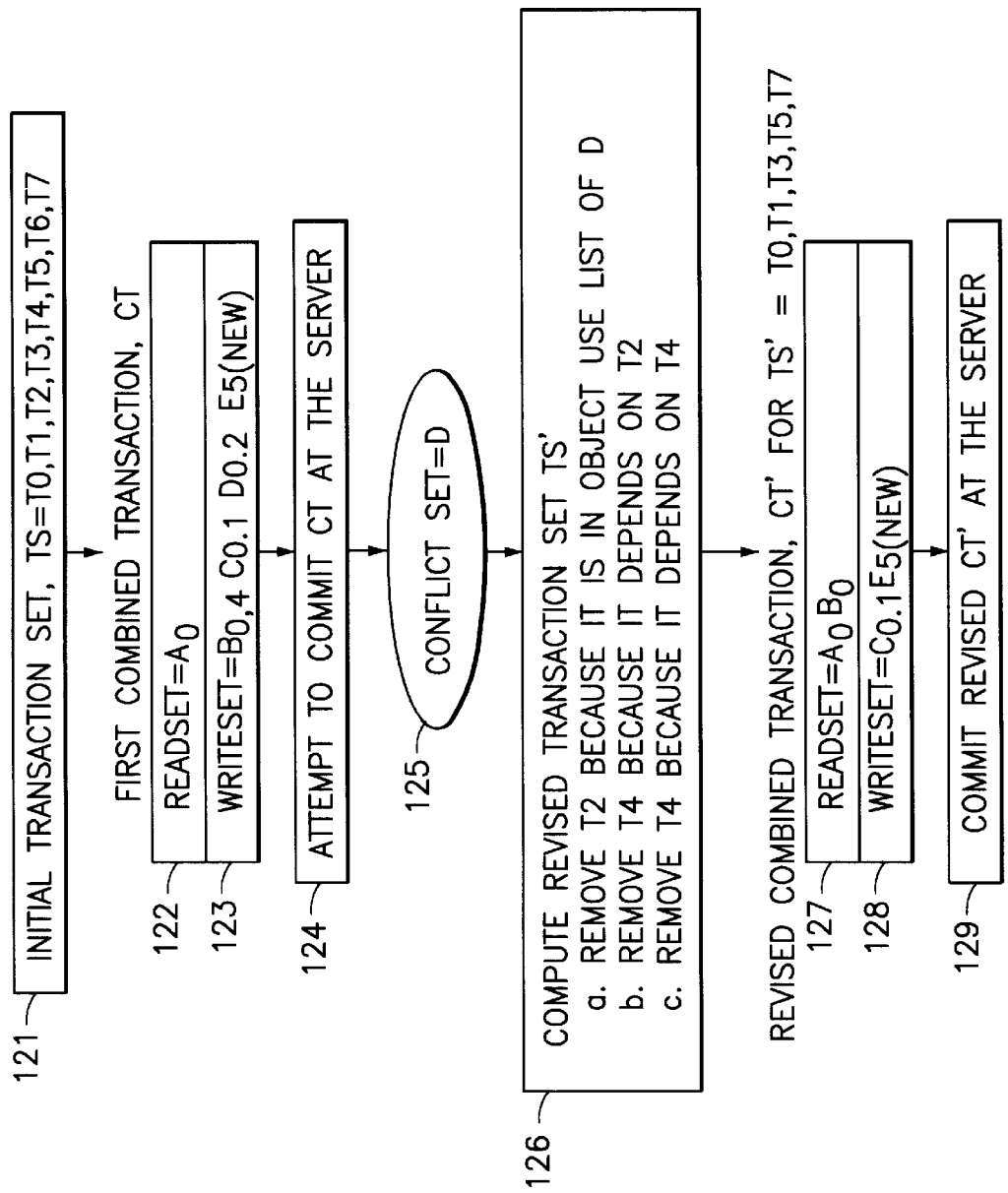
FIG. 12 provides a process flow example for the present invention.

FIG. 12 provides a detailed process flow using seven transactions (T1, T2, . . . T7) which ran sequentially while the client was disconnected. The Read Sets and Write Sets for each of the seven transactions are illustrated in FIG. 13; while FIG. 14 provides an overview of the interrelation dependencies of the seven transactions (i.e., transactions which use objects modified by previous transactions).

Figure 13:
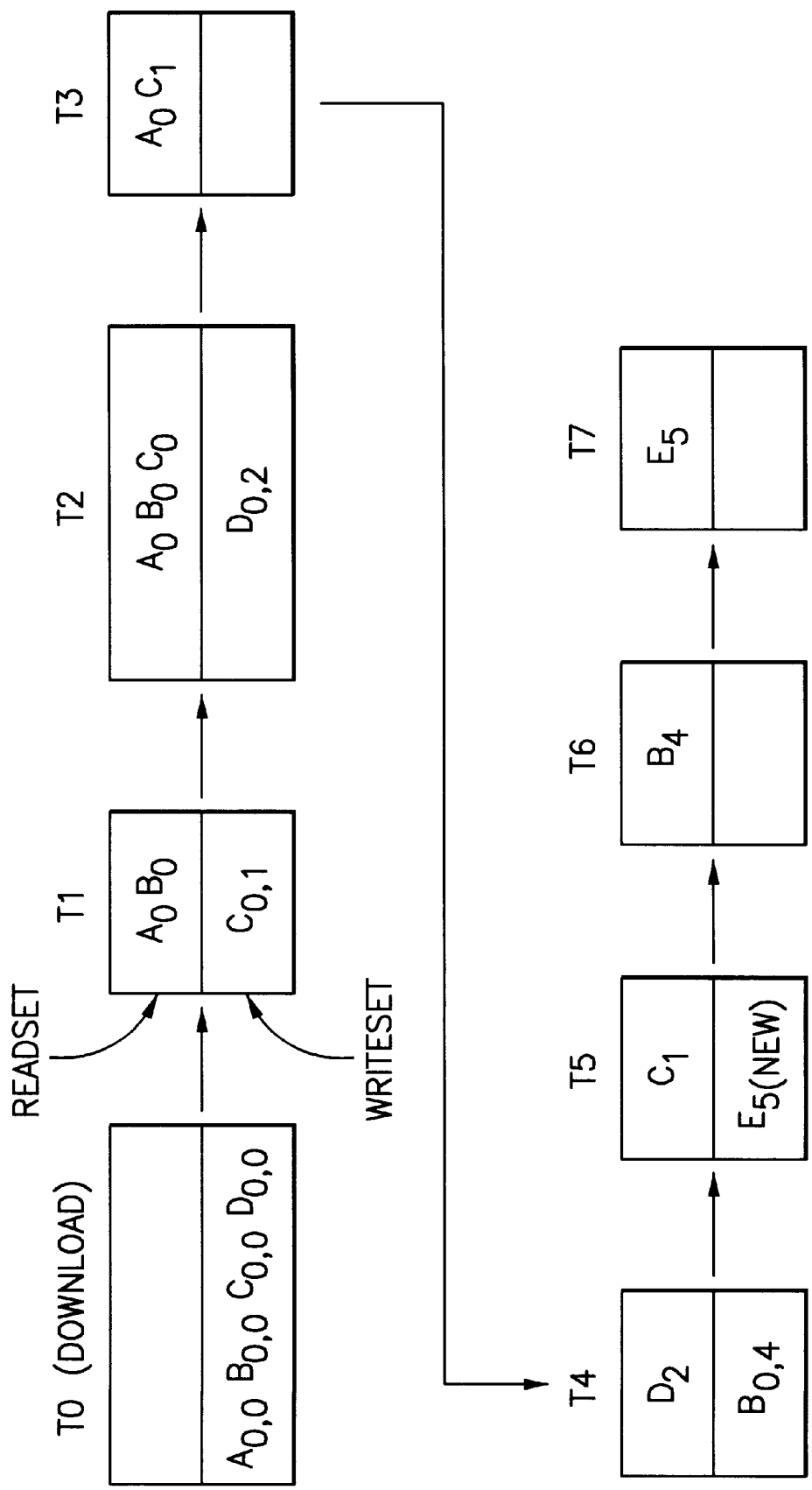
FIG. 13 illustrates the Read Sets and Write Sets for the seven transactions of the example of FIG. 12.

In FIG. 13, T0 is a special case and represents the transaction that ran while the client was connected to the server, and which downloaded initial versions of objects A, B, C and D, which are read and/or written by the transactions. The top half of each transaction contains the Read Set (i.e., the set of objects that were read by the transaction) and the lower half represents the Write Set (i.e., the set of objects which were either modified or created by the transaction). In this example, T1 read objects A and B and modified object C. The subscripts designate the version information about an object. For the Read Set, the single subscript identifies the transaction that last modified or created the object that was read. Thus, T1 read the version of object A that was created by T0, and E was newly created by T5. For the Write Set, the first subscript is the same as the subscript for the Read Set (i.e. it is the version of the object that was read by the transaction). The second subscript is the new version number of the object. In this example, the transaction number than modified the object is used to designate the new version number. Therefore, T1 read the 0 version of object C and generated the 1 version.

Figure 14:
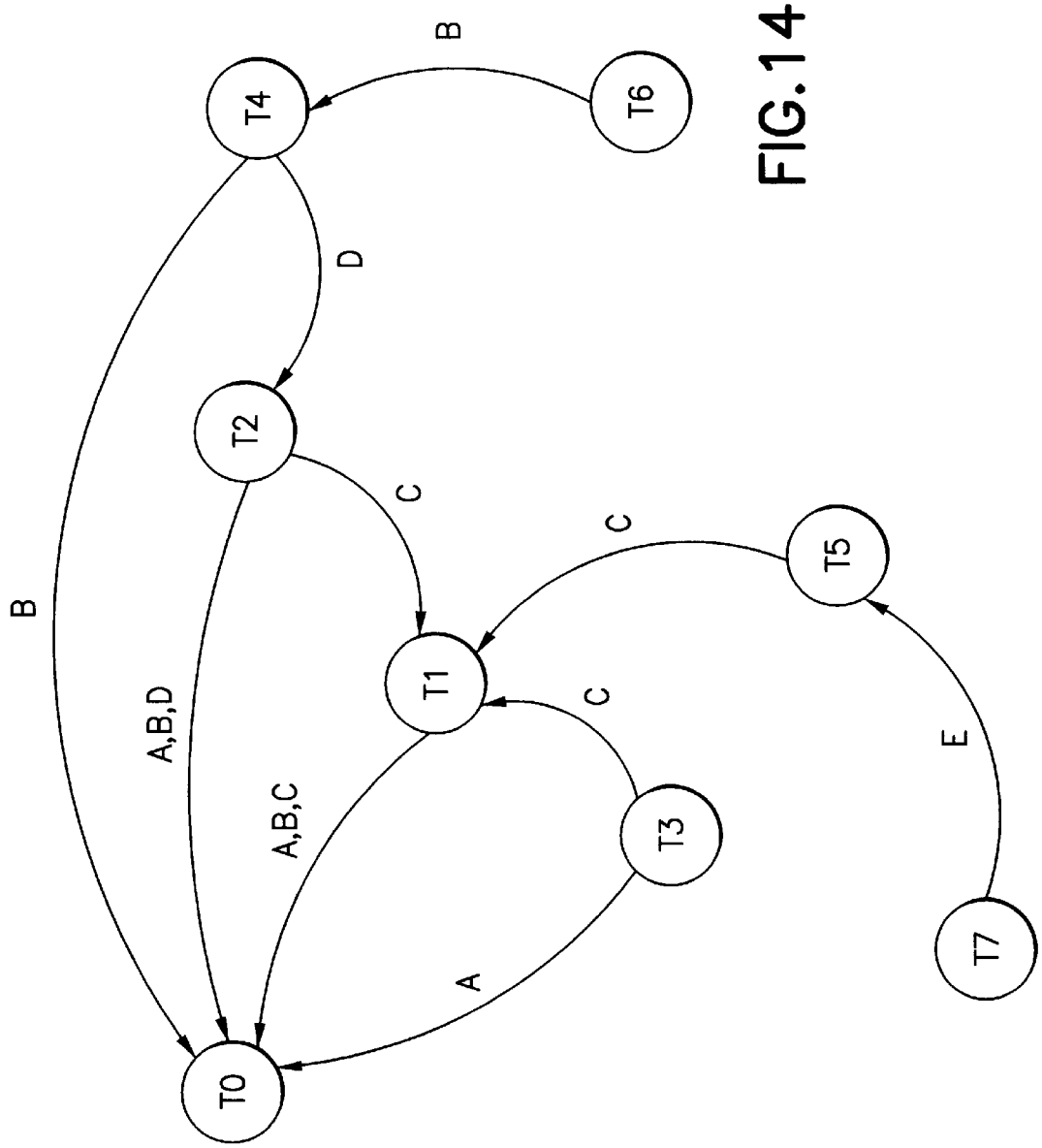
FIG. 14 illustrates a transaction dependency chart for the seven transactions of the example of FIG. 12.

FIG. 14 is the transaction dependency graph for the example, and is derived from FIG. 13. The circles represent the transactions and the arcs represent the dependencies. The labels on the arcs represent the objects that cause the dependencies. For example, T1 depends on T0 for its version of objects A, B and C; and T2, T3 and T5 depend upon the T1 version of object C. A dependency means that if a transaction fails during replay, any transaction that depends on it will also fail. For example, if T2 fails in this graph, then T4 will fail, having read the D information created by T2, and T6 will fail, having read B which had been modified by T4.

FIG. 12 provides a process flow during operation for the seven illustrated transactions, with the variant situation in which locks are held during replay. During the initial pass, the transaction set consists of all of the transactions, T1 through T7, as shown at 121. The combined Read Set is version 0 of object A, as seen at 122. The combined Write Set, 123, id the 0,4 version of object B, the 0,1 version of object C, the 0,2 version of object D, and the new object E (version 5). Note that objects are either in the Read Set or the Write Set, but not both. Read Share locks are obtained on objects in the Read Set and exclusive locks are obtained for objects in the Write Set. If an object was modified multiple times, only the last version would be part of the Write Set, except that its initial version number would be from the T0 transaction.

In this example, when the combine transaction was replayed, it was rejected and a conflict set was returned, consisting of object D, at 125. The method then computes a revised combined transaction Set at 126. Since transaction T2 depends on object D, it is removed from the set. This, in turn, causes T4 to be removed because it depended on the execution of T2. T6 is removed because it depended on T4. Therefore, the revised combined transaction consists of the Read Set A0 and B0, shown at 127, and the Write Set C01 and E5, at 128. Note that object B is now in the Read Set, since the transaction that had modified B, T2, has been removed from the transaction set. The revised combined transaction is sent to the server and committed at 309, This transaction will complete without failing since locks were held after the first pass. Note that exclusive locks are obtained for objects in the Write Set, while Read Set objects only require Read Share locks.

Yet another implementation (not shown) would allow the client to add transactions to TS as each transaction completes, while replay is occurring at the server. An example of how the client addition to TS would operate is as follows: assuming that transactions T1, T2 and T3 complete in some initial period of time on the client, an initial transaction set TS1, consisting of T1, T2 and T3, is sent to the server for processing while the client is concurrently processing T4. If the server rejects TS1, because of a conflict involving the objects in T3 only, then a new transaction set TS2 can be calculated using T1, T2 and T4 (assuming that T4 did not depend on T3). The new transaction set, TS2, would be sent to the server for processing. In this manner, additional transmissions would be avoided and a separate transaction set for T4 is not required. Furthermore, the client is allowed to operate while the server is processing. What cannot be guaranteed is whether TS2 will be accepted, even if locks were obtained and held during TS1 processing, because there may be lock conflicts with the objects that are in T4.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for replaying transactions which completed at a client computer while disconnected from an associated server, wherein said client transactions operated upon data items downloaded from said server, comprising the steps of:

(a) combining a plurality of transactions into a first combined transaction;

(b) transmitting said first combined transaction to the server;

(c) replaying said first combined transaction at the server;

(d) determining if replay of all transactions in said first combined transaction was successful;

(e) committing said first combined transaction at said server if said determining indicated that replay was successful.

2. A method for replaying transactions which completed at a client computer while disconnected from an associated server, wherein said client transactions operated upon data items downloaded from said server, comprising the steps of:

(a) generating a transaction set of a plurality of transactions which completed at the client;

(b) combining all transactions in said transaction set into a first combined transaction;

(c) transmitting said first combined transaction to the server;

(d) replaying said first combined transaction at the server;

(e) determining if replay of all transactions in said first combined transaction was successful;

(f) committing said first combined transaction at said server if said determining indicated that replay was successful.

3. The method of claim 2 further comprising, if said determining indicated that replay was unsuccessful, assembling a conflict set comprising one or more data items rejected at the server during the replay of said combined transaction; and returning said conflict set to said client.

4. The method of claim 2 further comprising the steps, if said determining indicates that replay was unsuccessful, of:

(a) assembling a conflict set comprising one or more data items rejected at the server during replay;

(b) returning said conflict set to said client;

(c) generating a revised transaction set at said client by removing transactions which used data items in said conflict set from said transaction set;

(d) re-combining transactions in said revised transaction set into a successive combined transaction;

(e) returning said successive combined transaction to said server;

(f) re-playing said second combined transaction at the server;

(g) determining if replay of all transactions in said second combined transaction was successful;

(h) repeating steps (a) through (g) if said replay is unsuccessful; and (i) committing said second combined transaction at said server if said determining indicates that replay was successful.

5. The method of claim 4 wherein said generating of a revised transaction set further comprises identifying transactions dependent upon transactions which used data items in said conflict set; removing said identified transactions from said transaction set; and iteratively removing transactions dependent upon said removed transactions until all such dependent transactions have been removed.

6. The method of claim 5 further comprising setting locks at the server for those data items which are not part of the conflict set.

7. The method of claim 4 further comprising setting locks at the server for those data items which are not part of the conflict set.

8. The method of claim 4 wherein said combining additionally comprises generating a Read Set of data items read by said completed transactions, and a Write Set of data items modified or created by said completed transactions.

9. The method of claim 8 wherein said creating of said combined Write Set further comprises the step of determining which version of each of said write data items comprises the most-recently updated version, and eliminating all but said most recently updated versions from said set.

10. The method of claim 4 wherein said combining additionally comprises generating a Read Set of data items read by said completed transactions, a Write Set of data items modified or created by said completed transactions, and for each data item a list of transactions that used a version of said data item.

11. The method of claim 10 wherein said creating of said combined Write Set further comprises the step of determining which version of each of said write data items comprises the most-recently updated version and eliminating all but said most recently updated versions from said set.

12. The method of claim 10 wherein said generating of a revised list comprises removing from said transaction list transactions relying upon data items modified at the server by referencing said list.

13. The method of claim 4 whereby subsequent transactions continue to execute on said client during replay of said combined transaction at said server.

14. The method of claim 13 wherein said subsequent transactions are added to the original transaction set before said generating of said revised transaction set.

15. The method of claim 10 whereby subsequent transactions continue to execute on said client during replay of said combined transaction at said server.

16. The method of claim 15 further comprising adding said subsequent transactions to the original transaction set before said generating of said revised transaction set.

17. The method of claim 16 further comprising adding said subsequent transactions to said list of data items.

18. A method at a client computer for combining transactions for replay at an associated server, said transactions having completed at said client while disconnected from said server, wherein said transactions operate on one or more data items downloaded from said server; comprising the steps of:

creating a combined Read Set of all data items read by said completed transactions; and creating a combined Write Set of all write data items created by or modified by said completed transactions.

19. The method of claim 18 wherein said creating of said combined Write Set further comprises the step of determining which version of each of said write data items comprises the most-recently updated version and eliminating all but said most recently updated versions from said set.

* * * * *